United States Patent Office 2,995,563
Patented Aug. 8, 1961

2,995,563
PROPIOPHENONES AND METHODS FOR THEIR PREPARATION
Werner Richard Boehme and John Koo, Somerville, N.J., assignors to Ethicon, Inc., a corporation of New Jersey
No Drawing. Filed Feb. 17, 1959, Ser. No. 793,693
10 Claims. (Cl. 260—297)

This invention relates to a new series of organic compounds. More particularly, it is concerned with certain β-hydroxy-β-substituted propiophenones and salts thereof and methods for preparing propiophenones.

The novel compounds of this invention are 2-$R_1$-3,6-$R_2$, $R_3$-β-$R_4$-propiophenones wherein the $R_1$ substituent is hydrogen or hydroxy, $R_2$ and $R_3$ are hydrogen or alkoxy, preferably lower alkoxy, such as methoxy, ethoxy, propoxy, isopropoxy, butoxy, isobutoxy, pentoxy, etc. and $R_4$ is a pyridyl.

The propiophenones of this invention are prepared by condensation of the corresponding $R_3$-carboxaldehyde, i.e., pyridine-carboxaldehyde with a 2-$R_1$-3,6-$R_2$,$R_3$-acetophenone (wherein the $R_1$, $R_2$ and $R_3$ substituents are those given above), in the presence of a basic ion-exchange resin catalyst, e.g., a quaternary ammonium resin in the hydroxide cycle. Although this method is particularly useful for the preparation of the novel compounds of this invention, it is a widely applicable process and it is intended that the scope of this invention, as it relates to the process, embrace the method of preparing β-hydroxy propiophenones broadly by the reaction of a carboxaldehyde with an acetophenone.

The novelty and uniqueness of the process described herein will be at once apparent when it is realized that the usual procedure for preparing β-hydroxy propriophenones involves the use of strong sodium hydroxide solution or pyridine or piperidine catalysts to condense an aldehyde with a ketone. This process produces yields which are usually low and accompanied by tarry by-products which are difficult to separate. The predominant products are acrylophenones with none or only small amounts of the corresponding aldols which are, incidentally, the subject of this application.

The superiority of the novel process is readily discernable from the results obtained in Example VI (infra) which shows the preparation of 4-hydroxy-4-(2-pyridyl)-2-butanone, a known substance, in a yield of 70% when the ion-exchange catalysis process is used, whereas Marvel & Stille, J. Org. Chem. 22, 1451 (1957) obtained a 41% yield of the same substance using sodium hydroxide as a catalyst.

The reaction may be carried out at 10° C. to 100° C. in the presence of an organic solvent such as an alkanol or aqueous alkanol, the latter in strength from about 50% to 100%. When the desired propiophenone precipitates out, it is separated from the ion-exchange catalyst by washing with a dilute solution of an inorganic acid such as hydrochloric acid or sulfuric acid to dissolve the propiophenone. If high concentrations of alkanol are used, e.g., 95% or higher, the propiophenone remains in solution and the resin is filtered out. The filtrate is evaporated, taken up with a dilute inorganic acid, e.g., hydrochloric acid and cooled. The corresponding salt of the propiophenone crystallizes out. If the free base is desired, the alkanol solution is merely concentrated to a small volume and, the propiophenone crystallizes out on cooling.

The novel propiophenones are useful as coronary dilators and tranquilizers. Their utility has been established by tests conducted as described by Craver et al. J. Phar. Expt'l. Ther. 93, 135 (1948) and Winter, J. Phar. Expt'l. Ther. 94, 7 (1948).

The compounds of this invention may be converted to their therapeutically useful acid addition salts by reaction with an appropriate acid, as for example, an inorganic acid such as a hydrohalic acid, i.e., hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxy-benzoic or 2-acetoxy-benzoic acid. Those compounds containing a phenolic hydroxyl group ($R_1$=OH) may be converted to soluble salts with a base, i.e., sodium hydroxide, triethylamine, diethanolamine, diethylaminoethanol, triethanolamine trinitrate and N-isopropylarterenol.

The invention will be described in greater detail in conjunction with the following specific examples.

*Example I*

A solution of 9.3 parts by weight of pyridine-2-carboxaldehyde and 13 parts by weight of o-hydroxyacetophenone in 100 parts by volume of ethanol is cooled in an ice bath. Twenty parts by weight of Amberlite IRA–400 (OH), previously washed with ethanol, is added and the suspension is stirred gently for about twenty-four hours while the ice melts during the first two hours. The resulting yellow amber filtrate is separated from the resin by filtration and concentrated under reduced pressure on a steam bath. The residue is taken up in a slight excess of 2 parts by weight of hydrochloric acid, washed with ether and neutralized with saturated sodium bicarbonate solution. The precipitated oil, which gradually solidifies, is crystallized from methanol, giving colorless crystals of β-(2-pyridyl)-2,β-dihydroxy propiophenone, melting at 109–110° C. The hydrochloride, which melts at 170–171° C. (dec.) is prepared by chilling a solution of the base in dilute hydrochloric acid.

*Example II*

A suspension of 5.2 parts by weight of pyridine-3-carboxaldehyde, 7.8 parts by weight of o-hydroxyacetophenone and 10 parts by weight of Amberlite IRA–400 (OH) in 50 parts by volume of ethanol is stirred slowly for twenty-four hours. The resin is removed by filtration and the filtrates are distilled under reduced pressure below 50° C. The viscous yellow residue is taken up in 1.5 parts by volume of hydrochloric acid and washed with ether. Upon cooling in the refrigerator, colorless crystals of β-(3-pyridyl)-2,β-dihydroxy-propiophenone hydrochloride separated. Melting point: 181–182° C. (dec.).

*Example III*

The procedure described in Example I is applied to pyridine-4-carboxaldehyde. There is obtained a colorless crystalline precipitate of β-(4-pyridyl)-2-β-dihydroxypropiophenone, melting point: 147–149° C., when recrystallized from ethanol.

*Example IV*

A suspension of 13.5 parts by weight of o-hydroxyacetophenone, 4.8 g. of pyridine-4-carboxaldehyde and 20 g. of Amberlite IRA–400 (OH) in 100 ml. of 50% aqueous ethanol is stirred at room temperature for twenty hours and filtered. The precipitate was extracted with dilute sodium hydroxide solution, filtered again, and the filtrates were neutralized with acetic acid. Recrystallization of the precipitate from aqueous ethanol gave β-(4-pyridyl)-2,β-dihydroxy-propiophenone, melting point: 147–149° C.

Example V

A mixture of 0.65 part by weight of pyridine-3-carboxaldehyde, 1.0 part by weight of 2-hydroxy-3,6-dimethoxy-acetophenone (prepared according to the method of Baker et al., J.C.S., 1939, 1922) and 2.0 parts by weight of Amberlite IRA–400 (a quaternary ammonium resin in the hydroxide cycle) in 10 parts by volume of ethanol is stirred for twenty-four hours. The resin is removed by filtration, the filtrates are evaporated under reduced pressure. The residue of β-(3-pyridyl)-2,β-dihydroxy-3,6-dimethoxy propiophenone forms light yellow needles melting at 173–175° C. when recrystallized from methanol.

Example VI

A solution of 5.2 parts by weight of pyridine-2-carboxaldehyde in 100 parts by volume of acetone is cooled in a Dry-Ice bath and 10 parts by weight of freshly washed Amberlite IRA–400 (OH) is stirred for twenty-four hours in the cold bath while the Dry Ice evaporates and the mixture reaches room temperature. The resin is filtered off and the filtrates are concentrated on the steam bath under reduced pressure. The residue of light orange oil is recrystallized from heptane to yield 5.4 parts by weight (70%) of colorless crystals of 4-hydroxy-4-(2-pyridyl)-2-butanone. Melting point: 75–76° C. (the melting point reported by Marvel et al. cited supra).

Example VII

A solution of 3.55 parts by weight of pyridine-3-carboxaldehyde and 5.54 parts by weight of 2-hydroxy-3-methoxy-acetophenone (prepared according to the method of Baker and Smith, J.C.S., 1936, 347) in 80 parts by volume of ethanol is stirred with 5 parts by weight of Amberlite IRA–400 (OH) for twenty-four hours. The suspension is filtered to remove the resin and the filtrates are concentrated to a small volume under reduced pressure at room temperature. The colorless crystals of β - (3 - pyridyl) - 2 - β - dihydroxy - 3 - methoxypropiophenone which separate from the solution on standing, melt at 173–175° C., when recrystallized from 80% ethanol.

Example VIII

A solution of 4.9 parts by weight of 2-hydroxy-3,6-dimethoxyacetophenone and 2.6 parts by weight of pyridine-4-carboxaldehyde in 100 parts by volume of 75% ethanol is stirred with 10 parts by weight of Amberlite IRA–400 (OH) for forty-eight hours. The resin is removed by filtration and the filtrate is evaporated under reduced pressure at room temperature. The residue is recrystallized from ether to yield colorless crystals of β - (4 - pyridyl) - 2,β - dihydroxy - 3,6 - dimethoxy propiophenone, melting at 123–125° C.

What is claimed is:
1. 2 - $R_1$ - 3,6 - $R_2$,$R_3$ - β - $R_4$ - β - hydroxypropiophenone wherein $R_1$ is a member of the group consisting of hydrogen and hydroxy, $R_2$ and $R_3$ are members selected from the group consisting of hydrogen and lower alkoxy and $R_4$ is pyridyl.
2. Therapeutically useful acid addition salts of the compounds of claim 1.
3. β-(2-pyridyl)-2,β-dihydroxypropiophenone.
4. β-(3-pyridyl)-2,β-dihydroxypropiophenone.
5. β-(4-pyridyl)-2,β-dihydroxypropiophenone.
6. β-(3-pyridyl)-2,β-dihydroxy-3,6-di-lower alkoxypropiophenone.
7. β-(4-pyridyl)-2,β-dihydroxy-3,6-di-lower alkoxypropiophenone.
8. β - (3 - pyridyl) - 2,β - dihydroxy - 3,6 - dimethoxypropiophenone.
9. β - (3 - pyridyl) - 2,β - dihydroxy - 3 - methoxypropiophenone.
10. β- (4 - pyridyl) - 2,β - dihydroxy - 3,6 - dimethoxypropiophenone.

References Cited in the file of this patent

Kunin: Ion Exchange Resins, p. 258, 2nd edition (1948).

Wagner et al.: Synthetic Organic Chemistry, p. 174 (1953).

Marvel et al.: J. Organic Chem., vol. 22, p. 1451 (1957).